United States Patent [19]

Barnard

[11] 3,996,667
[45] Dec. 14, 1976

[54] PAPER SHEET COUNTER AND SEPARATOR

[76] Inventor: George M. Barnard, P.O. Box 126, DeTour Village, Mich. 49725

[22] Filed: Aug. 11, 1975

[21] Appl. No.: 603,318

[52] U.S. Cl. .............................. 33/143 R; 294/1 R; 294/103 R
[51] Int. Cl.² ...................... B25B 9/00; G01B 3/22
[58] Field of Search ............... 294/1 R, 15, 16, 34, 294/86 R, 87 R, 103 R; 33/143 R, 143 F, 143 M, 143 J, 147 F, 169 R, 169 B, 163, 170, 168 B, 174 R

[56] References Cited

UNITED STATES PATENTS

| | | | |
|---|---|---|---|
| 196,976 | 11/1877 | Hill | 33/143 R |
| 1,040,078 | 10/1912 | Widen | 33/163 X |
| 1,553,387 | 9/1925 | McDermott | 33/169 B |
| 1,737,764 | 12/1929 | Jacobs | 33/170 X |
| 2,799,939 | 7/1957 | Bivans | 294/16 X |

FOREIGN PATENTS OR APPLICATIONS

| | | | |
|---|---|---|---|
| 67,876 | 5/1944 | Norway | 33/143 R |

Primary Examiner—Johnny D. Cherry
Attorney, Agent, or Firm—Woodhams, Blanchard and Flynn

[57] ABSTRACT

A rigid base with an integral post projecting thereabove between its ends has a tubular slideway formed through the post and the bottom of the base. A cylindrical slide is reciprocable in the slideway and has a picker finger secured to its bottom with opposite tapered ends projecting under the adjacent portions of the bottom of the base. A screw is threadedly engaged in a tapped bore in the top of said slide, and has a head on its upper end exteriorly of said post. The head is restrained against axial movement relative to said post. A slot formed vertically through the side of said post slidably receives a pin connected to said slide to prevent rotation of the slide. Said pin also serves as an indicator. A manually engageable handle is formed integrally with said base and said post.

4 Claims, 4 Drawing Figures

U.S. Patent  Dec. 14, 1976  3,996,667
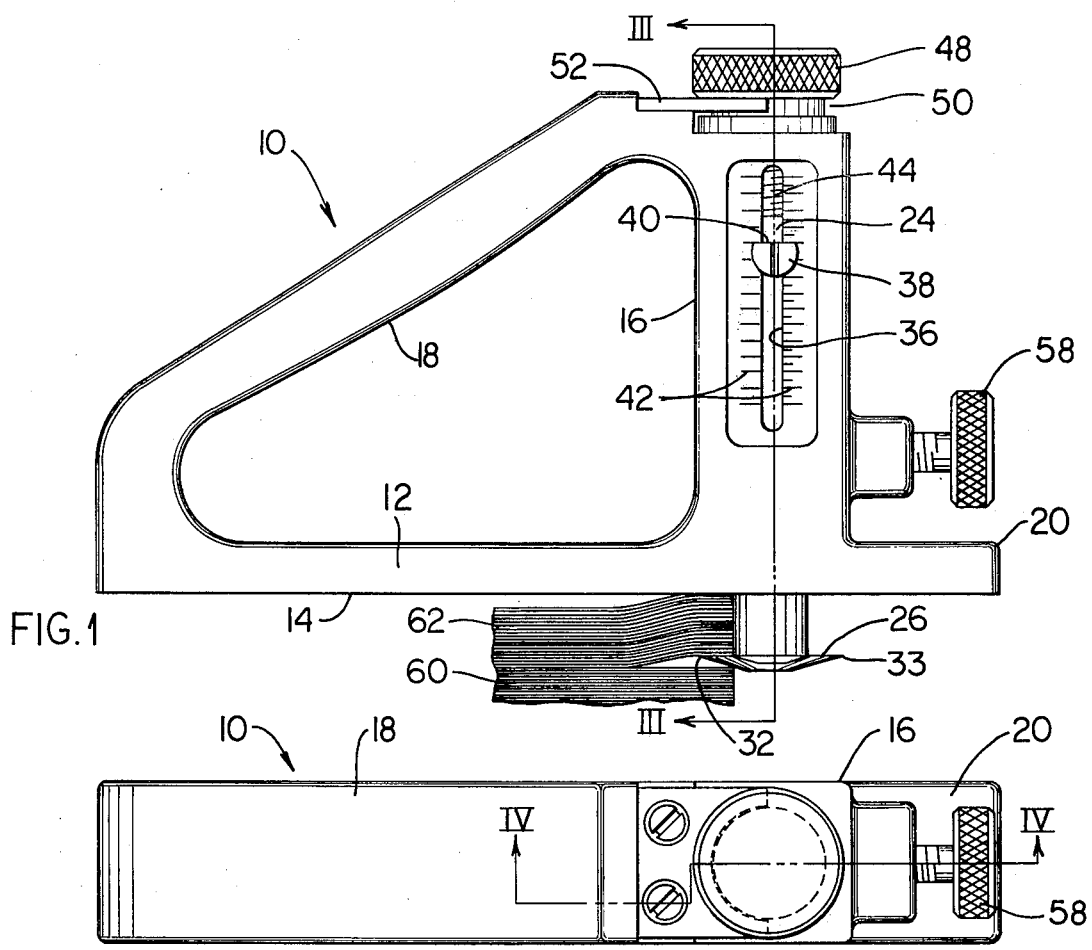
FIG. 1
FIG. 2
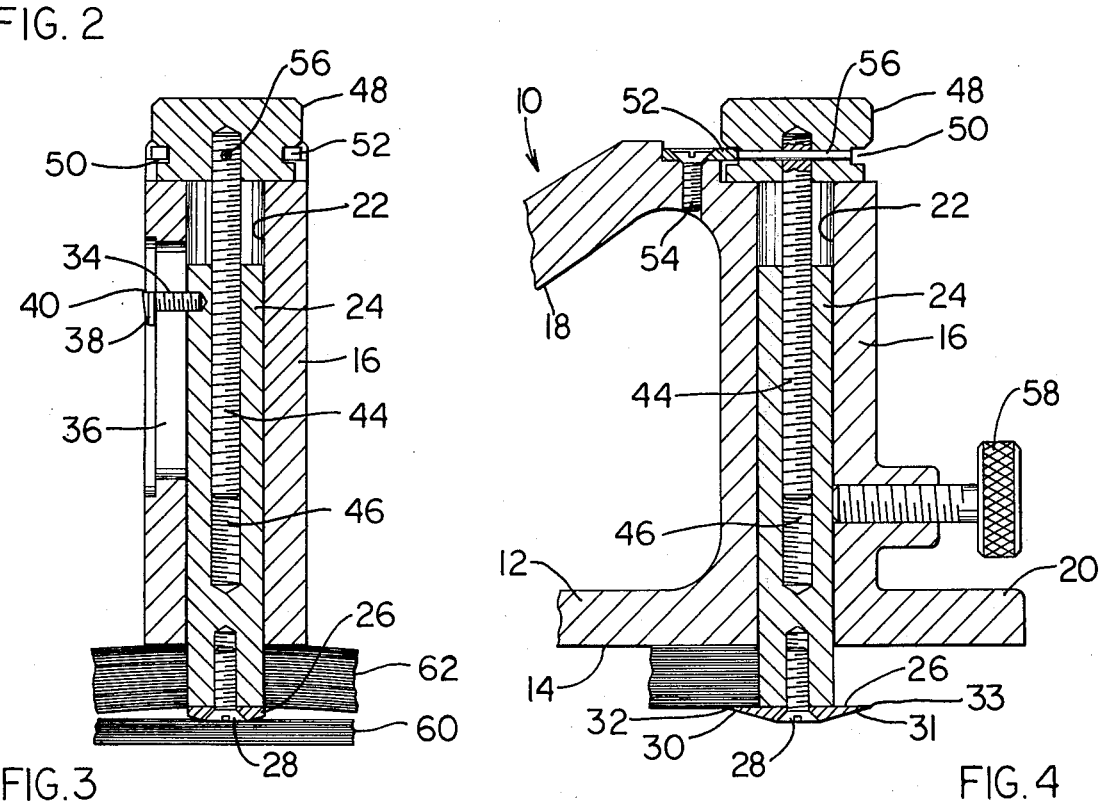
FIG. 3
FIG. 4

PAPER SHEET COUNTER AND SEPARATOR

BACKGROUND OF THE INVENTION

In the paper manufacturing and handling industry, it is common to cut, store and ship large stacks of separate sheets. The alignment of the edges of the sheets in each stack is quite accurately maintained so that the sides of the stack are flat and substantially vertical. These large stacks are usually broken down into smaller stacks or groups of sheets for further processing, such as cutting, printing or forming into individual sales packages. It is usually desirable to form such smaller stacks or groups with equal numbers of sheets so that an accurate count thereof can be maintained. Intricate and automatic sheet counters capable of individually successive sheets and separating them into smaller groups are available. However, as far as is known, no manually operable tool has been provided for rapidly separating successive small groups of accurately controlled numbers of sheets from the top of a supply stack of the sheets.

The present invention provides an inexpensive hand tool that can be quickly and easily applied to the top of a large supply stack of sheets, either in a forwardly thrusting or rearwardly dragging motion relative to the side of the stack, to force a taper edged finger into the side of the stack. The distance or space between the penetrating finger and the bottom of the tool can be accurately controlled and adjusted to permit only the desired number of sheets to enter between said bottom and the finger. After the penetration into the stack has been accomplished, the tool is shifted to expose the top side of the remaining stack of sheets, or it is lifted to provide sufficient separation of the measured small group of sheets for the operator to insert his hand and complete the separation and removal of the small group. The shape of the tool and the position of the penetrating finger relative to the bottom of the tool permit accurately repeatable numbers of sheets to be separated into successive groups.

The drawings, of which there is one sheet, illustrate a practical and preferred form of the tool.

FIG. 1 is a side elevational view of the tool of the invention in operative group separating relation to the top of a stack of separate sheets.

FIG. 2 is a top plan view of the tool as shown in FIG. 1.

FIG. 3 is a vertical transverse cross sectional view along the plane of the line III—III in FIG. 1.

FIG. 4 is a fragmentary, vertical, longitudinal cross sectional view along the plane of the broken line IV—IV in FIG. 2.

For convenience in description, the terms "upper", "lower", "left", "right", "front" and "rear" will have reference to the sheet counter of the invention and parts associated therewith as appearing in FIG. 1. The terms "inner", "outer" and derivatives thereof will have reference to the geometric center of said paper counter and parts associated therewith.

DETAILED DESCRIPTION

The tool is built or assembled on an integral metal frame indicated generally at 10 and consisting of a straight base 12 having a flat bottom 14. An upright post 16 of generally rectangular cross section projects vertically from the base, and an inclined bar 18 forming a handle or grip connects the left end of the base to the top of the post. The base projects a short distance beyond the opposite side of the post from the handle as at 20. The bottom 14 of the base 12 and its projecting end 20 are co-planar and perpendicular to the post 16.

A vertical cylindrical bore 22 through the post 16 and the bottom of the base slidably receives a cylindrical rod 24 as a slide member, and the bottom end of the slide member has a relatively thin finger element 26 secured to its lower end, below the base, by a screw 28. The finger element is oval shaped and has oppositely projecting ends 30 and 31 which project beyond the left and right sides of the bore 22. The top of the finger element is flat and can be drawn up flush against the bottom 14. The ends 30 and 31 are smoothly tapered upwardly to substantially zero thickness at their outer edges 32 and 33.

A pin in the form of a small screw 34 is engaged in the side of the slide member 24 and projects through a slot 36 in one side of the post 16, to act as an antirotation guide for the post. The screw 34 has a head 38, the top of which is flattened at 40 to act as an indicator edge or surface coacting with indicia scales 42 marked on the side of the post along the edges of the slot 36.

Movement of the slide member 24 to adjust its position in the post is effected by an adjusting screw 44 which is engaged in a tapped bore 46 formed in the upper part of the cylindrical slide member. The screw has a head 48 on its upper end which overlies the top of the post 16 and acts as an adjusting fingerpiece. A peripheral slot 50 in the screw head slidably receives the edge of a retaining plate 52 having an arcuate notch riding in the slot. The plate 52 is secured to the top of the post 16 by screws 54. The head 48 is nonrotatably connected to the screw, when the two parts are formed separately, by a cross pin 56.

A set screw 58 threaded through the front of the post 16 locks the slide member 24 in any of its adjusted positions.

OPERATION

When the flat bottom 14 of the base 12, or its projecting end 20, is laid or held flat on the surface of a stack of paper sheets 60, as in FIGS. 1, 3 and 4, one or the other thin tapered edge 32 or 33 of the finger element 30 can be drawn leftwardly, or pushed rightwardly, to engage with the side of the stack. The tapered edge will penetrate between the sheets of the stack whereby the selected group of sheets 62 can be lifted sufficiently from the remainder of the stack to permit the fingers of the operator to be inserted under the group to be separated from the stack.

Alternatively, after the tapered edge of the finger has penetrated the stack, the tool can be drawn laterally across the top of the remainder of the stack, thus sliding the entire separated group to a position where it can be conveniently grasped and moved as desired.

As the tool may be used on stacks of paper of different thickness and compression and as it is possible to press the tool against the stack with different manual pressures, the indicia scale 42 is only an approximation or indication of the number of sheets separated into each group. However, with some manual care in using the tool, the number of sheets separated in successive groups can be accurately duplicated. An accurate count of the sheets in the first of a series of groups can be obtained and thereafter duplicated, or adjusted.

The rod 24 may be provided with an extension at its lower end to accommodate the tool to the counting of larger or thicker groups of sheets.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An adjustable separator for picking groups of preselected numbers of sheets from the top of a supply stack of the sheets comprising:
   a base having a straight bottom adapted to lie flush on the top of said stack and having a post extending from the opposite side of the base from its bottom;
   said base and said post defining a slideway opening perpendicularly through said bottom of said base, said slideway being a tubular bore;
   a slide member slidable in said slideway and projectable below said base, said slide member being a cylindrical rod;
   a finger element secured to the bottom of said slide member and having an end portion projecting beyond said slideway in lapped relation to said bottom of said base and tapering in its projecting end to minimum thickness;
   adjusting means connected to said slide member and projecting exteriorly of said post to reciprocate said slide member in said slideway and move said finger element relative to said bottom of said base, said adjusting means including a screw element threadedly engaged with said rod and having a head on its upper end restrained against axial movement relative to said post;
   releasable lock means carried by said post and engageable with said slide member to lock the slide member in said slideway, said lock means being a screw threaded through said post and engageable at its inner end with said rod;
   an indicator member carried by said slide member and reciprocable therewith and visible on the outside of said post;
   an indicia on the outside of said post in coacting relation to said indicator member;
   means preventing rotation of said slide member in said slideway; and
   a handle grip connected to said base.

2. A separator as defined in claim 1, in which the bottom of said base extends substantially beyond the opposite sides of said slide member; and
   said finger element has two tapered end portions projecting oppositely from said slide member below said bottom.

3. A separator as defined in claim 1, in which said base, said post and said handle grip are formed integrally with the handle grip connected at its ends to one end of said base and the top of said post.

4. A separator as defined in claim 1, in which said means preventing rotation of said cylindrical slide member is a pin projecting therefrom through a slot provided therefor in a wall of said post and lengthwise thereof; and
   said indicator member is carried on the outer end of said pin.

* * * * *